May 6, 1969     G. T. DOWNEY ET AL     3,442,384
COMBINATION FILTER AND SURGE RESISTANT BY-PASS VALVE
Filed July 11, 1967

INVENTORS
GEORGE T. DOWNEY
WILLIAM J. SAMPLE

BY *Dicke & Craig*
ATTORNEYS

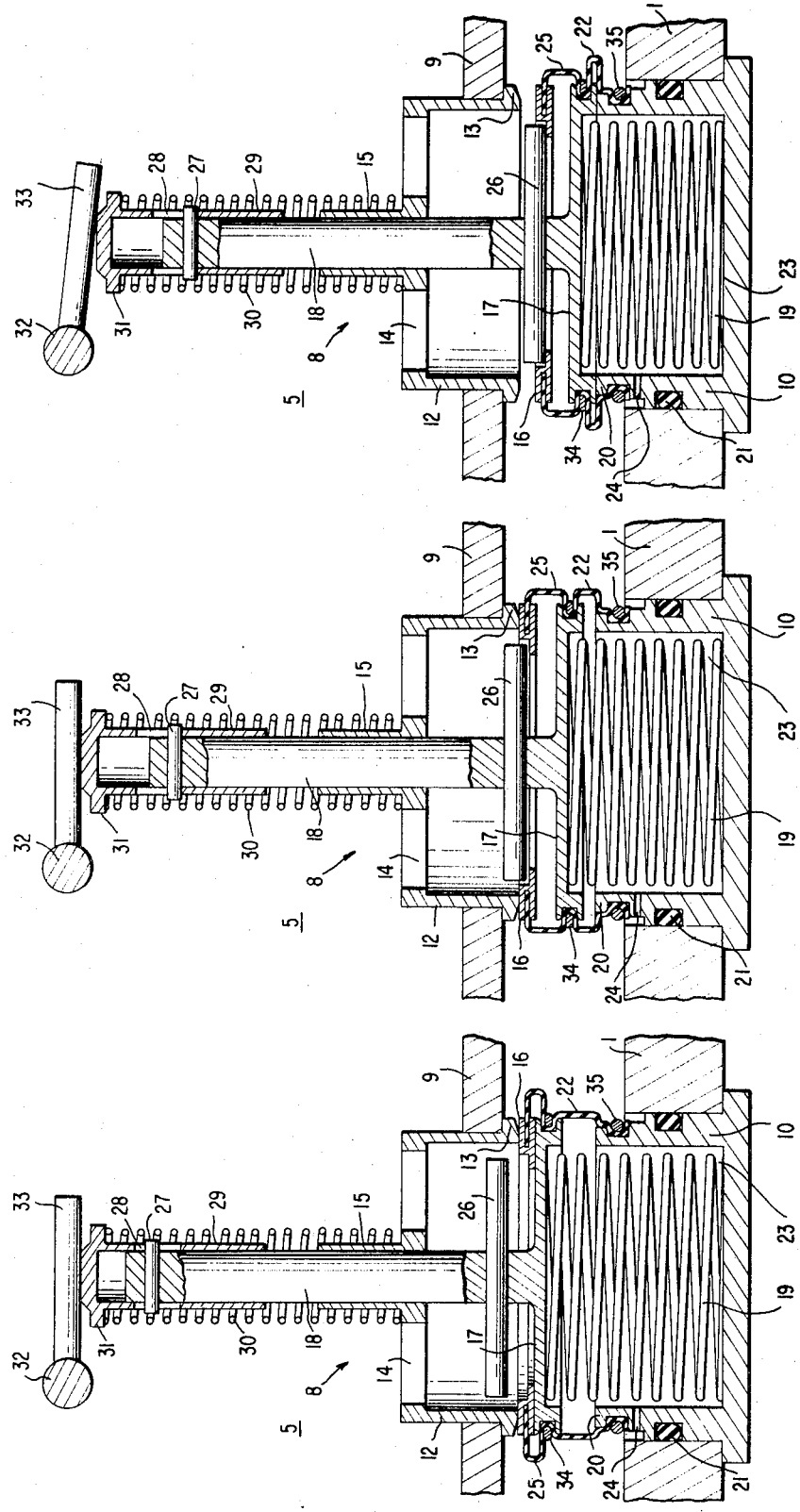

United States Patent Office 3,442,384
Patented May 6, 1969

3,442,384
COMBINATION FILTER AND SURGE RESISTANT BYPASS VALVE
George T. Downey and William J. Sample, Corry, Pa., assignors to Aero-Flow Dynamics, Inc., Corry, Pa.
Filed July 11, 1967, Ser. No. 652,603
Int. Cl. B01d *35/14, 27/10;* F16k *17/10*
U.S. Cl. 210—90       11 Claims

ABSTRACT OF THE DISCLOSURE

A fluid filter element, particularly for use in aircraft fuel systems, having a pressure responsive valve for bypassing the filter when it becomes clogged and produces a large pressure differential across the filter. The valve employs two relatively moveable valve portions connected together for relative limited movement by mechanical lost motion connection and sealed with respect to each other by means of a diaphragm. The valve portions are also sealed by a diaphragm with a dash-pot chamber for dampening movement of the outer most valve portion. The surfaces of the valve portions are arranged such that the outermost valve portion first moves away from the valve seat and after a predetermined movement it will engage the inner most valve portion and move it away from the valve seat to open the bypass valve. The valve position indicator is provided with a lost motion connection so that the initial movement of the outer most valve portion will not affect the indicator.

---

Practically all of the prior art fluid filters have incorporated a bypass valve, usually spring loaded, which will open at a predetermined differential pressure to allow fluid to bypass the filter. In the case of an aircraft fuel system, for example, the normal fuel flow is through a filtering element intended to remove impurities from the fuel. If the filtering element becomes plugged with contamination, a bypass valve is provided as an alternate path for the fuel.

Frequently, bypass valves incorporate a mechanism for signaling a predetermined pressure somewhat above the clean flow pressure drop through the unit in order that maintenance activity may be initiated prior to actual opening of the bypass valve. Conventional bypass valves are usually unable to distinguish between a short duration pressure pulse and a relatively long duration differential pressure application. Consequently, the bypass valve will activate its signal and open to allow the passage of fluid even if the differential pressure is applied for only a fraction of a second.

Aircraft fuel systems, by the very nature of their design and installation, are prone to experience rapid changes in flow rate throughout their operating regime. Also, vibrations and accelerations can result in appreciable changes in differential pressure even though the change may not exist for any appreciable length of time. A typical example is in the starting of an engine; the flow rate changes rapidly from zero to several hundred percent of the normal flow rate, then decreases to a steady state. During this rapid change in flow rate, the filter element and bypass valve are subjected to a considerably higher differential pressure than normal. Under these conditions, the bypass valve signal might actuate and the bypass valve might open. If there are any contaminants lodged in the vicinity of the bypass valve which could be swept through the orifice created by its opening, the function of the filter element will have been circumvented. Also, the conventional differential pressure bypass valve signal would have been actuated, falsely indicating a contaminated filter element so then unnecessary and costly maintenance would be initiated.

It is an object of the present invention to overcome the above mentioned disadvantages and provide a satisfactory economical fuel filter bypass valve that will not be affected by a short duration high pressure differential.

Although the specific valve structure may have application in other areas, it is particularly suitable and advantageous when in combination with a fuel filter, as set forth in the preferred embodiment. The bypass valve includes a first moveable valve portion in the form of an annular ring in seating engagement with the stationary annular valve seat, and a second moveable valve portion in the form of a plate normally in sealing or non-sealing engagement with the first valve portion and closing the space defined by the annular ring. The two valve portions are connected together for limited lost motion movement and sealed with respect to each other by a flexible diaphragm. The second valve portion forms the piston of a fluid dash-pot chamber and is sealed with respect thereto by means of another flexible diaphragm. The second valve portion is provided with an indicator operating plunger having a mechanical lost motion connection therewith. A short duration pressure pulse will be dampened by the dashpot chamber with only the second valve portion moving so that the first diaphragm and first valve portion maintain the valve in its closed position, and the indicator lost motion connection will not actuate the indicator. A relatively long duration pressure differential will move the second valve portion away from the valve seat against the dash-pot resistance until it picks up and moves the first valve portion away from the seat to open the valve; substantially simultaneously with or prior to movement of the first valve portion, the indicator is actuated to indicate fluid bypass so that suitable maintenance may be initiated, that is so that the fluid filter may be cleaned or replaced. Preferably, the first valve portion has surfaces arranged such that it will be held in sealing engagement by fluid pressure alone after the second valve portion has moved away from the valve seat.

Further objects, features, advantages and variations of the present invention will become more clear from the following detailed description of a preferred embodiment of the present invention in connection with the accompanying drawing, wherein:

FIGURE 3 is a longitudinal partial cross sectional view through the bypass valve, on a greatly enlarged scale, along line III—III of FIGURE 2;

FIGURE 4 is a partial longitudinal cross sectional view, similar to FIGURE 3, showing the valve in the position it would assume after a pressure differential of relatively short duration; and FIGURE 5 is a partial longitudinal cross sectional view, similar to FIGURES 3 and 4, that shows the valve in its fully open position under the influence of an excess predetermined pressure differential of long duration.

Figure 1:
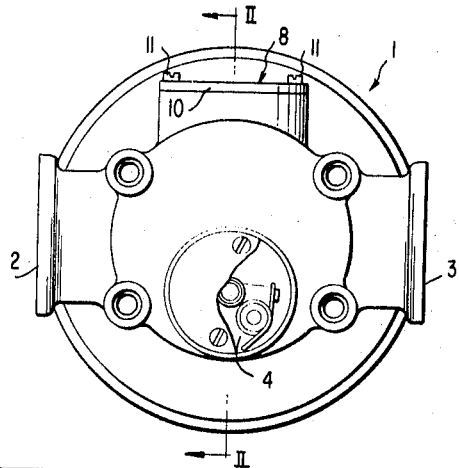
FIGURE 1 is a top plan view of a filter according to the present invention.

As shown in FIGURE 1, the fluid filter element is provided with a housing 1, provided with a fuel inlet 2 and a fuel outlet 3 of conventional construction. On the top of the housing there is provided a valve position indicator mechanism 4 that is mechanically operated to indicate fluid bypass so that suitable maintenance may be initiated; the specific structural details of the indicator mechanism have not been shown in detail and will not be described in detail, because as such they form no part of the present invention.

Figure 2:
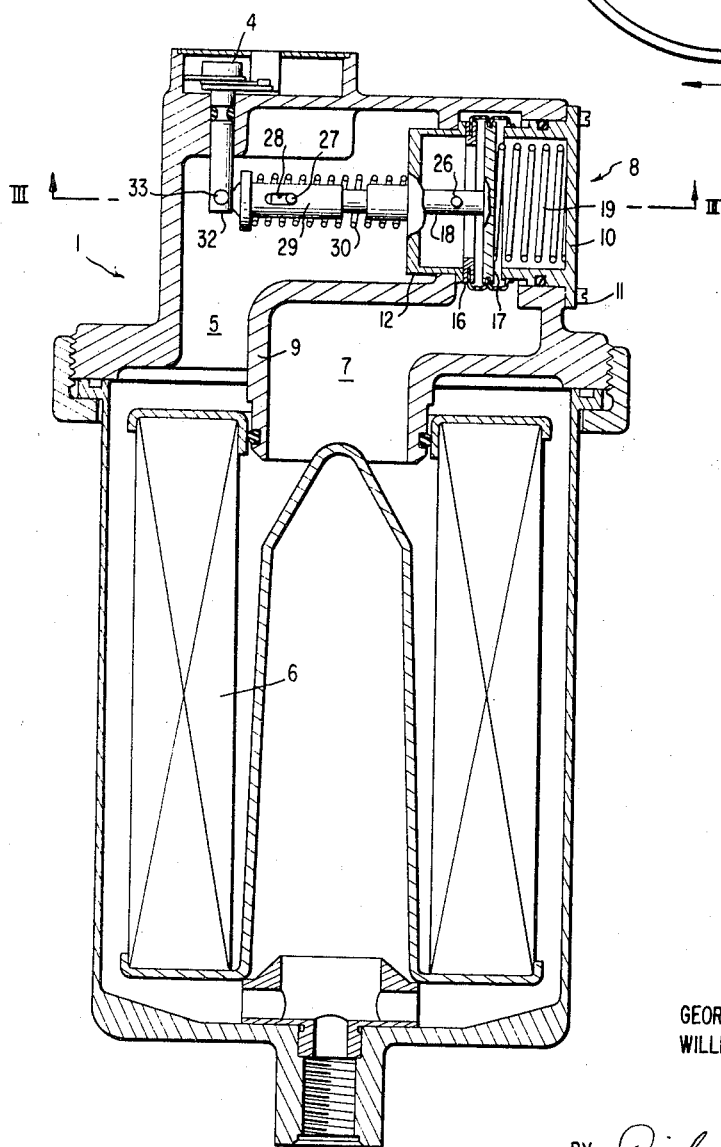
FIGURE 2 is a cross sectional view through the filter taken on line II—II of FIGURE 1.

As shown in FIGURE 2, the fuel is received within an inlet chamber 5 from the fuel inlet 2, normally passes through the filter element 6 into the outlet chamber 7, and thereafter passes out of the fuel outlet 3. A normal fluid pressure differential will exist between the inlet chamber 5 and the outlet chamber 7 due to the restriction inherent within the filter element 6. However, when the filter becomes clogged and dirty, this fluid pressure differential will increase proportionately until a point is reached where insufficient fuel is passed for proper operation; at this point, it is desired to bypass the filter element by means of the delayed response pressure relief valve 8 of the present invention. The valve 8 is mounted within the wall 9 that separates the chambers 5 and 7 and may be inserted and removed through the opening closed by the cover plate 10 that is mounted on the housing 1 by means of suitable screws, or the like, 11.

As shown more clearly in FIGURES 3–5, the valve 8 comprises a bushing seat 12 press fitted into a suitable opening within the wall 9 and prevented from axial movement upwardly, as shown in FIGURE 3, by the flange 13 that also forms the valve seat, which is annular. The upper portion of the bushing seat 12 is provided with a spider web type portion having fluid passageways 14 for rigidly supporting a collar 15.

As shown in FIGURE 3, the fluid passageway through the wall 9 is normally closed by means of a main poppet seal first valve portion or annular ring 16 in a sealing engagement with the valve seat 13, and a second plate like valve portion 17 integrally formed with the rod 18 to constitute a valve plunger. The first and second valve portions 16, 17 respectively, are spring biased into engagement with the seat 13 by means of the helical spring 19 that extends between the outer wall of the cover plate 10 and the second valve portion 17. The force of the spring 19 is normally sufficient to hold the first and second valve portions 16, 17 in sealing engagement with the valve seat 13 against the differential pressure force between the high pressure inlet chamber 5 and the low pressure outlet chamber 7.

As shown in FIGURE 4, the second valve portion 17 moves away from the valve seat 13 and the first valve portion 16 when it is subjected to a pressure in excess of a fixed predetermined pressure differential between the high pressure inlet chamber 5 and the low pressure outlet chamber 7; this pressure differential may be either of short duration or the initial exertion of a pressure differential that will thereafter last for a long period of time. The cover plate 10 has a tubular extension 20 that is provided with O-ring sealing means 21 to prevent fluid leakage between the cover plate 10 and the housing 1. The tubular extension 20 and an annular flexible diaphragm 22 that forms a seal between the relatively moveable second valve portion 17 and the tubular extension 20 together define a fluid dash-pot dampening chamber 23 that is in fluid communication with the low pressure outlet chamber 7 only through the throttling restricted outlet orifice 24. Therefore, movement of the second valve portion 17 away from the valve seat 13 is dampened and delayed by means of the fluid dash-pot chamber 23 and orifice 24. Movement of the valve between the positions of FIGURES 3 and 4 does not affect the indicator, because of a lost motion connection to be described hereinafter and does not move the first valve portion to open the relief valve, because of a lost motion and sealing connection to be described hereinafter. In the position of FIGURE 4, the space between the first and second valve portions is sealed by means of the flexible annular diaphragm 25. The high pressure within the chamber 5 acts upon the entire surface of the second valve portion to drive it downwards against the bias of the spring 19. However, the high pressure fluid within the chamber 5 acts upon the entire lower surface of the first valve portion 16 and only acts upon a smaller portion of the upper surface of the first valve portion 16 so that a net fluid pressure is exerted upwardly, with respect to FIGURE 4, to tightly and sealingly press the first valve portion into engagement with the seat 13.

Upon a longer duration of excess pressure differential, the valve will move from the position of FIGURE 4 into the open position and indicating position of FIGURE 5. Upon this further movement of the second valve portion 17 away from the seat 13, an abutment transverse pin 26 that is rigidly connected with the rod 18 will move into abuting engagement with the first valve portion 16 and positively drive the first valve portion 16 away from the valve seat 13 to provide an annular fluid bypass opening between the valve seat 13 and first valve portion 16 as shown in the open position of the valve according to FIGURE 5. During this movement, further dampening action will be produced by the dash-pot chamber 23 and orifice 24. Therefore, it is seen that the pin 26 provides a mechanical lost motion connection between the first valve portion 16 and the second valve portion 17. The rod 18 extends through and is slideably guided within the collar 15. The outer end of the rod 18 is provided with a rigidly connected transverse pin that is received within an elongated slot 28 formed in the corresponding walls of a telescopically engaging sleeve 29. The pin 27 and slot 28 connection provides a mechanical lost motion connection between the sleeve 29 and the rod 18. A helical spring 30 extends between the bushing seat 12 and the radially extending flange 31 on the outer end of the sleeve 29 to bias the sleeve 29 away from the valve seat 13. The indicator mechanism 4 (not fully shown in FIGURE 5) is provided with a rotatable actuating shaft 32 that has an actuating crank arm 33 rigidly attached thereto. The outer end of the sleeve 29 abutingly engages the crank arm 33; the crank arm 33 being rotatably spring biased in the clockwise direction as viewed in FIGURE 5 by a suitable spring (not shown).

The indicator mechanism will not operate during or after short pulse pressure differentials or during the first brief portion of a long period pressure differential. During movement of the second valve portion 17 between the positions as indicated in FIGURES 3 and 4, the play within the lost motion pin-slot connection 27, 28 will be taken up, but there will be no appreciable relative movement of the sleeve 29 or crank arm 33, so that there will be no visible indication of a bypass or impending bypass that would otherwise produce unnecessary and costly maintenance. During movement of that first and second valve portions 16, 17 between the positions of FIGURE 4 and FIGURE 5, the pin 27 will engage the bottom of the slot 28, as viewed in the figures, to positively drive the sleeve 29 toward the valve seat 13 against the bias of the spring 30 to allow the indicator spring (not shown) to clockwise pivot the crank arm 33 and produce an impending bypass or bypass indication in the indicator mechanism 4.

Preferably, the diaphragms 22 and 25 are formed from a single annular resilient tube having one end clamped sealingly between suitable flanges of the annular ring 16, an intermediate portion sealingly clamped within an annular recess in the outer periphery of the second valve portion 17 by means of a diaphragm retainer ring 34, and an opposite end portion sealingly clamped within a suitable annular recess provided in the outer upper periphery of the tubular extension 20 by means of a second diaphragm retainer ring 35.

To summarize the operation, the upstream pressure within the inlet chamber 5 is separated from the downstream relatively lower pressure within the outlet chamber 7 by means of the poppet valve seat 13, first valve portion 16, flexible diaphragm 25, second valve portion 17, and the wall 9, as shown in FIGURE 1. Under normal conditions, the upstream pressure is higher than the downstream pressure by reason of the pressure drop through the filter element 6. Under the condition depicted in FIGURE 1, the differential pressure is insufficient to deflect either of the springs 19, 30. The larger of the two springs 19 forces the second valve portion 17 against the first valve portion 16, which is in turn seated against the valve seat 13. This spring force is supplemented by the downstream pressure internally applied to the valve portions which have an effective pressure receiving area greater than the upstream valve portion effective pressure receiving area. Consequently, there will be no flow past the bypass valve mechanism. The smaller of the two springs, 30, exerts a pressure against the impending bypass indicator crank arm 33 to hold it in its "nonindicating" position; in the position of FIGURE 1, the force of the spring 30 is isolated from the rod 18.

Under the force of short duration excess pressure differentials between the chambers 5 and 7, the rod 18 and second valve portion 17 may move away from the first valve portion 16 without producing any movement of the first valve portion 16, because the flexible diaphragm is the only connection between the two and the effective high pressure area of the first valve portion is greater in the seating direction. The fuel trapped in the dash-dot chamber 23 that is formed by the access cover plate 10, second valve portion 17 and diaphragm 22 can escape only through the relatively small orifice 24 to produce a damping action.

The position of FIGURE 2 may be used to actuate the indicating mechanism to indicate an impending bypass, but not a complete bypass. The pressure differential producing the positions indicated in FIGURE 2, represents a sufficient upstream pressure to deflect the large spring 19 to the point where the pin 27 has engaged the bottom of the slide slot 28 to compress the small spring 30 and remove the spring load from the actuator crank arm 33, thus producing a signal (by mechanisms which are not necessarily part of this disclosure). It will be noted that in FIGURE 2, bypass flow has not yet taken place.

As upstream pressure is raised higher in relation to the downstream pressure, both springs, 19, 30 are further compressed to the point where the abutment pin 26 engages the first valve portion to open the bypass valve and permit fluid bypass, and the pin 27 further moves the sleeve 29 to indicate fluid bypass in the indicator mechanism 4. This final position is shown in FIGURE 5.

The speed of indication and the speed of bypass valve opening may be controlled by suitably sizing the orifice 24 without affecting the pressures at which these events occur to prevent false operation and indications caused by relatively short pressure pulses that should be ignored.

The foregoing preferred embodiment has been specifically described for purposes of illustration, and further modifications, embodiments and variations are contemplated within the spirit and scope of the present invention as defined by the following claims.

We claim:

1. A delayed response pressure relief valve, comprising: a relatively stationary valve seat generally defining a fluid passageway; relatively movable valve means for normally closing said passageway defined by said seat and for moving away from said seat under the influence of a predetermined excess differential pressure across said passageway to open said passageway; said movable valve means comprising a first valve portion sealingly engaging said seat, a second valve portion, and means for providing a fluid seal between said first and second valve portions and allowing only limited relative movement between said first and second valve portions; damper means for normally dampening all movement of said second valve portion toward and away from said valve seat; said damper means including a fluid dash-pot chamber having relatively rigid walls, a throttling restricted outlet orifice of predetermined size in communication with the fluid on one side of said passageway, and an annular flexible diaphragm sealingly connected between said second valve portion and said relatively rigid walls of said dash-pot chamber.

2. The valve of claim 1, including means for normally biasing said second valve portion into engagement with said first valve portion to hold said first valve portion in seating engagement with said seat; said second valve portion including fluid pressure responding surface means for moving said second valve portion against said biasing means away from said seat under a predetermined fixed differential pressure across said valve; said first valve portion including surface means for holding said first valve portion tightly against said seat under the influence of said predetermined fixed differential pressure independently of said second valve portion; lost motion providing means including an abutment rigidly mounted on said second valve portion for engaging said first valve portion and positively moving said first valve portion away from said valve seat only after a predetermined movement of said second valve portion away from said seat.

3. The valve of claim 2, including a valve position indicator having a mechanically actuated indicator mechanism and mechanical lost motion means for driving said indicator mechanism only after a predetermined fixed movement of said second valve portion away from said seat.

4. The valve of claim 3, said seat being annular; said first valve portion being an annular ring; said second valve portion inculding a valve plate for peripherally engaging said annular ring on its side opposite from said seat and closing the space defined by said annular ring; said sealing means including a flexible annular diaphragm sealingly connected between said first valve portion and said second valve portion.

5. The valve of claim 4, said second valve portion having an integral rod extending centrally through the space defined by said annular ring and said seat; said mechanical lost motion means including a sleeve telescopically mounted axially on said rod, a pin and slot connection between said rod and sleeve for providing axial lost motion therebetween, and a spring urging said sleeve axially away from said seat; said indicator mechanism having a control abutment portion spring biased into axial engagement with said sleeve.

6. The valve of claim 5, said biasing means including a spring mounted in said dash-pot chamber.

7. The valve of claim 6, in combination with a fluid filter comprising: a housing having a fluid inlet and a fluid outlet; a filter mounted in said housing; wall means for normally providing a fluid path only from said fluid inlet through said filter to said fluid outlet, and including means for mounting said pressure relief valve in said wall means in fluid communication between said fluid inlet and said fluid outlet to bypass said filter.

8. The valve of claim 7, wherein said abutment including a pin extending transversely through said rod and having its opposite ends in axial alignment with said annular ring.

9. The valve of claim 1, including a valve position indicator having a mechanically actuated indicator mechanism and mechanical lost motion means for driving said indicator mechanism only after a predetermined fixed movement of said second valve portion away from said seat.

10. The valve of claim 1, in combination with a fluid filter comprising: a housing having a fluid inlet and a fluid outlet; a filter mounted in said housing; wall means for normally providing a fluid path only from said fluid inlet through said filter to said fluid outlet, and including means for mounting said pressure relief valve in said wall means in fluid communication between said fluid inlet and said fluid outlet to bypass said filter.

11. A delayed response pressure relief valve, comprising: a relatively stationary valve seat generally defining a fluid passageway; relatively movable valve means for normally closing said passageway defined by said seat and for moving away from said seat under the influence of a predetermined excess differential pressure across said passageway to open said passageway; said moveable valve means comprising a first valve portion sealingly engaging said seat, a second valve portion, and means for providing a fluid seal between said first and second valve portions and allowing only limited relative movement between said first and second valve portions; said seat being annular; said first valve portion being an annular ring; said second valve portion including a valve plate for peripherally engaging said annular ring on its side opposite from said seat and closing the space defined by said annular ring; said sealing means including a flexible annular diaphragm sealingly connected between said first valve portion and said second valve portion; a valve position indicator having a mechanically actuated indicator mechanism and mechanical lost motion means for driving said indicator mechanism only after a predetermined fixed movement of said second valve portion away from said seat; said second valve portion having an integral rod extending centrally through the space defined by said annular ring and said seat; said mechanical lost motion means including a sleeve telescopically mounted axially on said rod, a pin and slot connection between said rod and sleeve for providing axial lost motion therebetween, and and a spring urging said sleeve axially away from said seat; said indicator mechanism having a control abutment portion spring biased into axial engagement with said sleeve.

References Cited

UNITED STATES PATENTS 2,998,138  8/1961  Mould et al. _____ 210—90

SAMIH N. ZAHARNA, *Primary Examiner.*

U.S. Cl. X.R.

110—70; 137—493; 210—133